US009410481B2

(12) United States Patent  
Palmer et al.

(10) Patent No.: US 9,410,481 B2  
(45) Date of Patent: Aug. 9, 2016

(54) SYSTEM AND METHOD FOR HIGH EFFICIENCY POWER GENERATION USING A NITROGEN GAS WORKING FLUID

(75) Inventors: Miles Palmer, Chapel Hill, NC (US); Rodney John Allam, Chippenham (GB); Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 562 days.

(21) Appl. No.: 13/235,746

(22) Filed: Sep. 19, 2011

(65) Prior Publication Data

US 2012/0067056 A1  Mar. 22, 2012

Related U.S. Application Data

(60) Provisional application No. 61/385,042, filed on Sep. 21, 2010.

(51) Int. Cl.
*F02C 3/34* (2006.01)
*F02C 6/00* (2006.01)
(Continued)

(52) U.S. Cl.
CPC .............. *F02C 3/34* (2013.01); *F01K 21/047* (2013.01); *F01K 23/10* (2013.01); *F02C 1/007* (2013.01);
(Continued)

(58) Field of Classification Search
CPC ............ F01D 25/30; F02C 7/08; F02C 7/105; F02C 3/34; F02C 5/02; F02C 7/36; F02C 9/32; F02C 9/28; F02C 7/10; F02C 1/007; F02C 6/003; F04D 27/0207; F01K 23/10; Y02E 20/16
USPC ................... 60/39.5–39.52, 793, 39.281, 795
See application file for complete search history.

(56) References Cited

U.S. PATENT DOCUMENTS

| | | | | |
|---|---|---|---|---|
| 3,971,211 A | * | 7/1976 | Wethe et al. | 60/39.181 |
| 4,202,169 A | * | 5/1980 | Acheson et al. | 60/39.12 |

(Continued)

FOREIGN PATENT DOCUMENTS

EP    1 429 000    6/2004

OTHER PUBLICATIONS

A.J. Seebregts; *IEA ETSAP Energy Technology Systems Analysis Program: Gas-Fired Power*; © IEA ETSAP—Technology Brief E02—Apr. 2010 (5 pgs.) http://iea-etsap.org/web/E-TechDS/PDF/E02-gas_fired_power-GS-AD-get.pdf.

(Continued)

*Primary Examiner* — Phutthiwat Wongwian  
*Assistant Examiner* — Stefan Ibroni  
(74) *Attorney, Agent, or Firm* — Womble Carlyle Sandridge & Rice, LLP

(57) ABSTRACT

A method of power production using a high pressure/low pressure ratio Brayton Power cycle with predominantly $N_2$ mixed with $CO_2$ and $H_2O$ combustion products as the working fluid is provided. The high pressure can be in the range 80 bar to 500 bar. The pressure ratio can be in the range 1.5 to 10. The natural gas fuel can be burned in a first high pressure combustor with a near stoichiometric quantity of pressurized preheated air and the net combustion gas can be mixed with a heated high pressure recycle $N_2+CO_2+H_2O$ stream which moderates the mixed gas temperature to the value required for the maximum inlet temperature to a first power turbine producing shaft power.

23 Claims, 2 Drawing Sheets

(51) Int. Cl.
*F02C 7/10* (2006.01)
*F01K 21/04* (2006.01)
*F01K 23/10* (2006.01)
*F02C 1/00* (2006.01)
*F02C 9/48* (2006.01)

(52) U.S. Cl.
CPC . *F02C 6/003* (2013.01); *F02C 7/10* (2013.01); *F02C 9/48* (2013.01); *F05D 2240/40* (2013.01); *Y02E 20/16* (2013.01)

(56) References Cited

U.S. PATENT DOCUMENTS

| | | | | |
|---|---|---|---|---|
| 4,472,936 A * | 9/1984 | Uchiyama et al. | | 60/773 |
| 4,684,081 A * | 8/1987 | Cronin | | 244/58 |
| 4,754,607 A * | 7/1988 | Mackay | | 60/723 |
| 4,765,143 A * | 8/1988 | Crawford et al. | | 60/671 |
| 4,831,817 A * | 5/1989 | Linhardt | | 60/39.12 |
| 4,852,996 A * | 8/1989 | Knop et al. | | 48/197 R |
| 5,184,460 A * | 2/1993 | Franciscus et al. | | 60/226.1 |
| 5,295,350 A * | 3/1994 | Child et al. | | 60/780 |
| 5,394,686 A * | 3/1995 | Child et al. | | 60/780 |
| 5,572,861 A * | 11/1996 | Shao | | 60/781 |
| 5,661,968 A * | 9/1997 | Gabriel | | 60/39.182 |
| 5,664,411 A * | 9/1997 | Shao | | 60/776 |
| 5,669,216 A * | 9/1997 | Ankersmit et al. | | 60/778 |
| 5,740,673 A * | 4/1998 | Smith et al. | | 60/783 |
| 5,743,079 A * | 4/1998 | Walsh et al. | | 60/773 |
| 5,865,023 A * | 2/1999 | Sorensen et al. | | 60/775 |
| 5,865,030 A * | 2/1999 | Matsuhama | | 60/736 |
| 6,141,953 A * | 11/2000 | Mongia et al. | | 60/774 |
| 6,170,264 B1 * | 1/2001 | Viteri et al. | | 60/671 |
| 6,260,348 B1 * | 7/2001 | Sugishita et al. | | 60/39.12 |
| 6,360,561 B2 * | 3/2002 | Allam et al. | | 62/654 |
| 6,389,814 B2 * | 5/2002 | Viteri et al. | | 60/716 |
| 6,532,745 B1 * | 3/2003 | Neary | | 60/784 |
| 6,598,398 B2 * | 7/2003 | Viteri et al. | | 60/716 |
| 6,931,856 B2 * | 8/2005 | Belokon et al. | | 60/772 |
| 6,945,029 B2 * | 9/2005 | Viteri | | 60/39.17 |
| 7,021,063 B2 * | 4/2006 | Viteri | | 60/791 |
| 7,043,920 B2 * | 5/2006 | Viteri et al. | | 60/716 |
| 7,074,033 B2 * | 7/2006 | Neary | | 431/5 |
| 7,124,589 B2 * | 10/2006 | Neary | | 60/784 |
| 7,147,461 B2 * | 12/2006 | Neary | | 431/5 |
| 7,162,875 B2 * | 1/2007 | Fletcher et al. | | 60/773 |
| 7,254,951 B2 * | 8/2007 | Lockwood, Jr. | | 60/774 |
| 7,284,362 B2 * | 10/2007 | Marin et al. | | 60/39.182 |
| 7,299,637 B2 * | 11/2007 | Becker | | 60/772 |
| 7,306,871 B2 * | 12/2007 | Grieve et al. | | 429/415 |
| 7,600,368 B2 * | 10/2009 | Lockwood, Jr. | | 60/39.17 |
| 7,740,672 B2 * | 6/2010 | Sprouse | | 48/77 |
| 7,743,861 B2 * | 6/2010 | Grieve | | 180/65.31 |
| 7,770,376 B1 * | 8/2010 | Brostmeyer | | 60/39.182 |
| 2002/0121080 A1 * | 9/2002 | Jones | | 60/39.281 |
| 2003/0221409 A1 * | 12/2003 | McGowan | | 60/39.17 |
| 2004/0128975 A1 | 7/2004 | Viteri | | |
| 2007/0122328 A1 * | 5/2007 | Allam et al. | | 423/235 |
| 2007/0180768 A1 * | 8/2007 | Briesch et al. | | 48/197 R |
| 2008/0173584 A1 * | 7/2008 | White et al. | | 210/656 |
| 2008/0173585 A1 * | 7/2008 | White et al. | | 210/656 |
| 2008/0176174 A1 * | 7/2008 | White et al. | | 431/5 |
| 2008/0226515 A1 * | 9/2008 | Allam et al. | | 422/168 |
| 2009/0064654 A1 * | 3/2009 | Kirzhner et al. | | 60/39.17 |
| 2009/0193812 A1 * | 8/2009 | Kirzhner | | F01K 23/101 60/783 |
| 2009/0229271 A1 * | 9/2009 | De Ruyck et al. | | 60/775 |
| 2009/0284013 A1 * | 11/2009 | Anand | | B01D 53/8625 290/52 |
| 2009/0301054 A1 * | 12/2009 | Simpson et al. | | 60/39.15 |
| 2010/0043387 A1 * | 2/2010 | Myers et al. | | 60/39.281 |
| 2010/0058758 A1 * | 3/2010 | Gilchrist et al. | | 60/605.2 |
| 2010/0139317 A1 * | 6/2010 | Chantant et al. | | 62/619 |
| 2011/0179799 A1 * | 7/2011 | Allam et al. | | 60/772 |

OTHER PUBLICATIONS

International Search Report and Written Opinion of the International Search Authority issued in corresponding International Application No. PCT/US2011/052342, mailed Feb. 19, 2013.

Office Action issued in corresponding Chinese Application No. 201180055964.0 on Feb. 3, 2015.

* cited by examiner

SYSTEM AND METHOD FOR HIGH EFFICIENCY POWER GENERATION USING A NITROGEN GAS WORKING FLUID

CROSS-REFERENCE TO RELATED APPLICATIONS

This application claims the benefit of U.S. Provisional Patent Application No. 61/385,042, which was filed on Sep. 21, 2010, the disclosure of which is hereby incorporated herein in its entirety by reference.

FIELD OF THE DISCLOSURE

The present disclosure provides high efficiency methods for power production using a $N_2$ working fluid with combustion of a fuel in air.

BACKGROUND

As energy requirements continue to grow worldwide, there is an ever increasing need for additional power production processes. The current high efficiency method for power generation using natural gas fuel or distillate hydrocarbon fuels is the natural gas combined cycle (NGCC) system which comprises a Brayton Cycle gas turbine and a Rankine cycle steam system. The largest gas turbines commercially available are capable of a power output from the NGCC system in the range from about 450 MW (megawatts) to about 550 MW with lower heating value efficiencies in the range from about 56% to about 60% at ISO (International Organization for Standardization) conditions. Current single train units that employ a coal-fired boiler plus a steam generator are available that may have power outputs greater than 1,000 MW giving net electrical efficiencies of up to about 45% based on highest achievable steam conditions with current best boiler designs and materials. Nuclear reactors with a single steam turbine are available at power outputs greater than 1,000 MW.

In addition to the above, U.S. Patent Publication No. 2011/0179799 discloses a high pressure low pressure ratio power cycle using a carbonaceous or hydrocarbon fuel that is combusted the presence of a high concentration oxygen atmosphere and thus requires the provision of a highly pure oxygen source. The combustion products are cooled by a recycle of a high temperature, high pressure, and highly purified $CO_2$ stream that has been heated against a turbine exhaust stream in a heat exchanger.

As seen above, existing and emerging technology in the field can require the use of multiple cycles and/or provision of highly purified materials for combustion. Accordingly, there remains a need for power systems using natural gas or distillate fuels combusted in air that can provide power outputs from a single train of up to 500 MW or even more.

SUMMARY OF THE DISCLOSURE

The presently described systems and methods for power production can be highly useful for providing high efficiency power production and can exhibit one or more of the following characteristics.

The disclosed systems and methods can achieve, with a lower maximum turbine temperature than a conventional NGCC system, a comparable efficiency to a conventional NGCC system.

The disclosed systems and methods can achieve, with a turbine temperature equivalent to a conventional NGCC system, a higher efficiency than a conventional NGCC system.

The disclosed systems and methods can have significantly lower capital cost than a conventional NGCC system.

The disclosed systems and methods can utilize a single working fluid.

The disclosed systems and methods can utilize means other than a steam system to drive the turbine(s).

The disclosed systems and methods can be significantly more compact than a NGCC system.

The disclosed systems and methods can have a concentration of $CO_2$ in the exhaust gas that is significantly higher than the approximately 3% concentration in NGCC exhaust so that $CO_2$ could be more easily captured using an appropriate removal system.

The disclosed systems and methods can utilize air as a low cost oxidant source rather than requiring highly pure oxygen.

The disclosed systems and methods can provide for near stoichiometric combustion conditions that can result in the production of excess inert gases, which can be vented to the atmosphere.

The disclosed systems and methods can utilize a high pressure stream comprising inert gases in power production by expanding the stream across one or more turbines.

The disclosed systems and methods can provide a method of operating a power production process in which a fossil fuel can be combusted at high pressure in air at near stoichiometric conditions in a closed cycle with a high pressure low pressure ratio sufficient so that the pressurized excess inert gases remaining after consumption of oxygen in the combustor can be expanded to atmospheric pressure with maximum production of additional power.

Further to the above, in one embodiment the present disclosure provides a power production system. The power production system may comprise a first combustor configured to combust a first fuel stream and a first air stream in the presence of a first recycle stream to produce a first combustion stream, a first turbine configured to expand the first combustion stream, and a first heat exchanger configured to receive at least a portion of a first discharge stream from the first turbine. The first heat exchanger may be configured to employ the portion of the first discharge stream to heat the first air stream and at least a portion of the first recycle stream that is produced from the first discharge stream. The power production system may also include a second combustor configured to combust a second fuel stream and a second air stream in the presence of a second recycle stream that is produced from the first discharge stream to produce a second combustion stream, a second turbine configured to expand the second combustion stream, and a second heat exchanger configured to heat the second air stream and the second recycle stream.

In some embodiments the second heat exchanger may be configured to employ a second discharge stream from the second turbine to heat the second air stream and the second recycle stream. The second heat exchanger may be further configured to heat a second portion of the first recycle stream. The power production system may further comprise a third combustor configured to combust a third fuel stream and a third air stream in the presence of a second discharge stream received from the second turbine to produce a third combustion stream, and a third turbine configured to expand the third combustion stream. The second heat exchanger may be configured to employ a third discharge stream from the third turbine to heat the second air stream and the second recycle stream. The second heat exchanger may be further configured to heat the third air stream. The second heat exchanger may be further configured to heat a second portion of the first recycle stream.

In some embodiments a recycle compressor may be configured to compress the first recycle stream. A second portion of the first discharge stream may be directed to the second combustor. The power production system may further comprise a scrubber configured to receive a cooled discharge stream from the second heat exchanger. The scrubber may comprise a $CO_2$ adsorption system.

In some embodiments the power production system may further comprise an air compressor system configured to compress a feed air stream to produce the first air stream and the second air stream. The air compressor system may comprise a first air compressor configured to compress the first air stream and a second air compressor configured to compress the second air stream. The second air compressor may be further configured to compress the first air stream before the first air compressor compresses the first air stream. The air compressor system may be configured to control a flow rate of the first air stream and a flow rate of the second air stream to result in substantially stoichiometric combustion in the first combustor and the second combustor. For example, the air compressor system may be configured to control the flow rate of the first air stream and the flow rate of the second air stream to result in up to about 5% excess $O_2$ in the combustion in the first combustor and the second combustor.

In some embodiments the first fuel stream and the second fuel stream may comprise a compressed hydrocarbon gas. The compressed hydrocarbon gas may comprise methane. The first air stream and the second air stream may comprise compressed ambient air. The first recycle stream and the second recycle stream may be greater than 50% $N_2$ on a molar basis. The power production system may further comprise a separator configured to remove a liquid stream from the portion of the first discharge stream directed through the first heat exchanger. Further, the power production system may be configured to operate with a net electrical generation efficiency on a lower heating value basis of at least about 60% when operating with a turbine temperature from about 1,300° C. to about 1,500° C.

In another embodiment a method for producing power is provided. The method may comprise combusting a first fuel stream and a first air stream in a first combustor in the presence of a first recycle stream to produce a first combustion stream, expanding the first combustion stream in a first turbine to rotate the first turbine and produce power, directing at least a portion of a first discharge stream from the first turbine to a first heat exchanger, and employing the portion of the first discharge stream to heat the first air stream and at least a portion of the first recycle stream that is produced from the first discharge stream with the first heat exchanger. The method may further comprise combusting a second fuel stream and a second air stream in a second combustor in the presence of a second recycle stream that is produced from the first discharge stream to produce a second combustion stream, expanding the second combustion stream in a second turbine to rotate the second turbine to produce power, directing the second air stream and the second recycle stream to a second heat exchanger, and heating the second air stream and the second recycle stream with the second heat exchanger.

In some embodiments heating the second air stream and the second recycle stream with the second heat exchanger may comprise employing a second discharge stream from the second turbine to heat the second air stream and the second recycle stream. The method may further comprise heating a second portion of the first recycle stream with the second heat exchanger. The method may also include combusting a third fuel stream and a third air stream in a third combustor in the presence of a second discharge stream received from the second turbine to produce a third combustion stream, and expanding the third combustion stream in a third turbine to rotate the third turbine to produce power. Heating the second air stream and the second recycle stream with the second heat exchanger may comprise employing a third discharge stream from the third turbine to heat the second air stream and the second recycle stream. The method may additionally include heating the third air stream with the second heat exchanger. Also, the method may include heating a second portion of the first recycle stream with the second heat exchanger.

In some embodiments the method may further comprise compressing the first recycle stream with a recycle compressor. The method may also include directing a second portion of the first discharge stream to the second combustor. Additionally, the method may include directing a cooled discharge stream from the second heat exchanger to a scrubber. The scrubber may comprise a $CO_2$ adsorption system.

In some embodiments the method may further comprise compressing a feed air stream with an air compressor system to produce the first air stream and the second air stream. Compressing the feed air stream with the air compressor system may comprise compressing the first air stream with a first air compressor and compressing the second air stream with a second air compressor. Compressing the feed air stream with the air compressor system may comprise compressing the first air stream with the second air compressor before compressing the first air stream with the first air compressor. Further, the method may include controlling a flow rate of the first air stream and a flow rate of the second air stream with the air compressor system to result in substantially stoichiometric combustion in the first combustor and the second combustor. For example, the method may include controlling the flow rate of the first air stream and the flow rate of the second air stream with the air compressor system to result in up to about 5% excess $O_2$ in the combustion in the first combustor and the second combustor.

In some embodiments the first fuel stream and the second fuel stream may comprise compressed hydrocarbon gas. The compressed hydrocarbon gas may comprise methane. The first air stream and the second air stream may comprise compressed ambient air. The first recycle stream and the second recycle stream may be greater than 50% $N_2$ on a molar basis. The method may also include removing a liquid stream from the portion of the first discharge stream directed through the first heat exchanger with a separator. Further, the power may be produced at a net electrical generation efficiency on a lower heating value basis of at least about 60% when operating with a turbine temperature from about 1,300° C. to about 1,500° C.

An additional embodiment of a power production system is provided. The power production system may comprise an air supply configured to supply an air stream, a fuel supply configured to supply a fuel stream, and a combustor configured to combust the fuel stream and the air stream in the presence of a recycle stream to produce a combustion stream that is greater than 50% $N_2$ on a molar basis. The air supply and the fuel supply may be configured to supply the air stream and the fuel stream in a ratio configured to result in substantially stoichiometric combustion in the combustor with up to about 5% excess $O_2$. The power production system may further comprise a turbine configured to expand the combustion stream and a heat exchanger configured to receive at least a portion of a discharge stream from the turbine. The heat exchanger may be configured to employ the portion of the discharge stream to heat the air stream and at least a portion of the recycle stream that is produced from the discharge stream.

In some embodiments the power production system may further comprise a second combustor configured to combust a second fuel stream and a second air stream in the presence of a second recycle stream that is produced from the discharge stream to produce a second combustion stream, a second turbine configured to expand the second combustion stream, and a second heat exchanger configured to heat the second air stream and the second recycle stream.

An additional embodiment of a method for producing power is provided. The method may comprise combusting a fuel stream and an air stream in a combustor in the presence of a recycle stream to produce a combustion stream that is greater than 50% $N_2$ on a molar basis, wherein the ratio of the fuel stream to the air stream is controlled to result in substantially stoichiometric combustion with up to about 5% excess $O_2$. The method may further comprise expanding the combustion stream in a turbine to rotate the turbine and produce power, directing at least a portion of a discharge stream from the turbine to a heat exchanger, and employing the portion of the discharge stream to heat the air stream and at least a portion of the recycle stream that is produced from the discharge stream with the heat exchanger.

In some embodiments the method may further comprise combusting a second fuel stream and a second air stream in a second combustor in the presence of a second recycle stream that is produced from the discharge stream to produce a second combustion stream, expanding the second combustion stream in a second turbine to rotate the second turbine to produce power, directing the second air stream and the second recycle stream to a second heat exchanger, and heating the second air stream and the second recycle stream with the second heat exchanger.

BRIEF DESCRIPTION OF THE FIGURES

In order to assist the understanding of embodiments of the disclosure, reference will now be made to the appended drawings, which are not necessarily drawn to scale. The drawings are exemplary only, and should not be construed as limiting the disclosure.

DETAILED DESCRIPTION

The disclosure now will be described more fully hereinafter through reference to various embodiments. These embodiments are provided so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In certain embodiments, the present disclosure comprises methods and systems that provide distinct advantages over known power production systems and methods. For example, in various embodiments, the present disclosure can provide for one or more of the following:

generation of electric power using ash-free gaseous fuels (such as, for example, natural gas) or ash-free liquid fuels (such as, for example, distillate fuels) in a Brayton cycle which combusts the fuel with air and in which the predominant component in the cycle is nitrogen;

the absence of a separate Rankine steam cycle to achieve high efficiency;

production of electric power at a net efficiency on a lower heating value (LHV) basis that is about the same as (or better than) the best current gas turbine combined cycle systems;

high pressures that may enable the system to define a relatively compact form factor and cost relatively little;

the systems may be customized to provide single train units with power output of greater than 500 MW as well as relatively compact units;

facilitation of $CO_2$ capture from the vent gas wherein the concentration of $CO_2$ is in the range of 10% to 12% molar by using near stoichiometric combustion of fuel in the compressed preheated air streams; and achieving low $NO_x$ levels in the exhaust gas by operating combustors at exhaust temperatures which are moderated by recycle streams that are rich in $N_2$ gas.

In specific embodiments, the disclosure can provide for operation of an air/clean fuel Brayton cycle power system without a steam cycle or oxygen plant giving lower capital cost than the current combined cycle units, with substantially no sacrifice of efficiency and with a $CO_2$ concentration in the exhaust of, for example, from about 10% molar and greater. In some embodiments, the system may remove additional $CO_2$ from the exhaust gas vented to atmosphere using an amine $CO_2$ scrubbing system.

Figure 1:
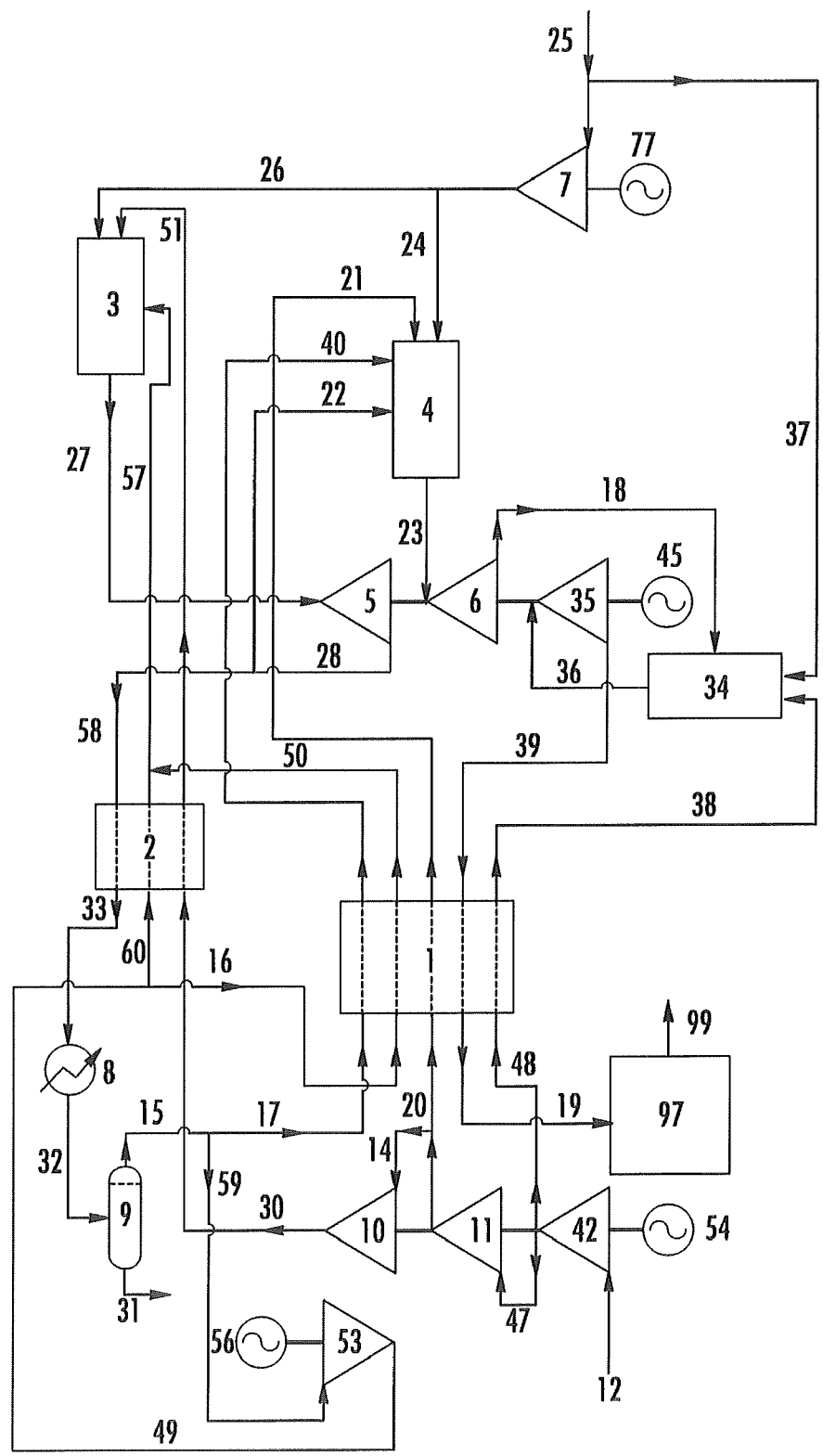
FIG. 1 provides a flow diagram illustrating one power production system including three turbines and method of operation thereof according to an embodiment of the disclosure.

The present disclosure will now be described with reference to the embodiment of the system illustrated in FIG. 1, which is not intended to be limiting of the disclosure and is rather provided to show exemplary embodiments. In general terms, FIG. 1 illustrates an embodiment of a Brayton cycle configured to produce power. The system may include first 3, second 4, and third 34 combustors. Each of the combustors 3, 4, 34 may respectively receive and combust a fuel stream (first 26, second 24, and third 37 fuel streams) with a heated compressed air stream (first 51, second 21, and third 38 heated compressed air streams) to produce respective combustion streams (first 27, second 23, and third 36 combustion streams). The combustion streams 27, 23, 36 are respectively supplied to first 5, second 6, and third 35 turbines, which expand the combustion streams to create rotary motion which may be converted into power. For example, the turbines 5, 6, 35 may be directly or indirectly coupled to an electric generator 45.

In order to increase efficiency, the system may include first 2 and second 1 heat exchangers. A portion 58 of a discharge stream 28 from the first turbine 5 may be directed through the first heat exchanger 2 in order to warm a first compressed air stream 30 and thereby form the first heated compressed air stream 51. The first heat exchanger 2 may also warm a first recycle stream 57 that is provided to the first combustor 3. The first recycle stream 57 may function to reduce the temperature in the first combustor 3 to thereby reduce the production of $NO_x$ in the combustion of the first fuel stream 26 with the first air stream 51. The first recycle stream 57 may also function to reduce the temperature of the combustion stream 27 exiting the first combustor 3 to a temperature that is at or below the maximum inlet temperature of the first turbine 5. The first recycle stream 57 may be formed by cooling the portion 58 of the discharge stream 28 from the first turbine 5 in the first heat exchanger 2 and a cooler 8, separating out a liquid stream 31 in a separator 9, compressing a portion 59 of the separated stream 15 in a recycle compressor 53, and directing a portion 60 of the compressed separated stream 49 back through the first heat exchanger. The first recycle stream 57 may also include the remaining portion 16 of the compressed separated stream 49 which has been heated in the second heat exchanger 1 to form a heated compressed separated stream 50.

The second heat exchanger 1 may be heated by the discharge stream 39 from the third turbine 35. In particular, the discharge stream 18 from the second turbine 6 may be directed through the third combustor 34, and the combustion stream 36 from the third combustor may be supplied to the third turbine 35. The discharge stream 18 from the second turbine 6 may thus be heated and combined with combustion gases to form the third combustion stream 36, which may be at a relatively higher temperature than the discharge stream from the second turbine 6, and hence the third turbine 35 may operate at a higher efficiency than if it received the discharge stream from the second turbine directly. The discharge stream 39 from the third turbine 35 is then directed to the second heat exchanger 1 and the cooled discharge stream 19 may then be discharged to atmosphere. Alternatively, as illustrated, the cooled discharge stream 19 may be directed through a scrubber 97 (e.g., a $CO_2$ adsorption system) configured to remove $CO_2$ and/or other gases before directing a vent gas 99 to the atmosphere.

The second heat exchanger 1 may be employed to heat the remaining portion 16 of the compressed separated stream 49 to form the heated compressed separated stream 50 that may be combined with the other portion 60 of the compressed separated stream 49 that is heated in the first heat exchanger 2 to form the first recycle stream 57, which is directed through the first combustor 3. The second heat exchanger 1 may also be employed to heat a remaining portion 17 of the separated stream 15 to form a second recycle stream 40 that is directed through the second combustor 4. The second recycle stream 40 may function to reduce the temperature in the second combustor 4 to thereby reduce the production of $NO_x$ in the combustion of the second fuel stream 24 with the second air stream 21. The second recycle stream 40 may also function to reduce the temperature of the combustion stream 23 exiting the second combustor 4 to a temperature that is at or below the maximum inlet temperature of the second turbine 6. In some embodiments a remaining portion 22 of the discharge stream 28 from the first turbine 5 may also be recycled through the second combustor 4 without first being cooled, heated, or otherwise processed after exiting the first turbine. The remaining portion 22 of the discharge stream 28 serves to allow nitrogen, argon, and other inert non-combustible components from the combustion air steams and the fuel streams together with most of the $CO_2$ and part of the water derived as a combustion product or present in the air streams or the fuel streams to be vented to atmosphere as stream 99 and prevent accumulation thereof in the system. The first turbine 5 may operate with a high inlet pressure and a low pressure ratio resulting in a high discharge pressure. The purpose of the second turbine 6 and the third turbine 35 with their associated combustors 4, 34 and the second heat exchanger 1 is to allow the pressure energy in the remaining portion 22 of the discharge stream 28 to be efficiently utilized to increase overall power production and efficiency of the process. The second heat exchanger 1 may also provide heat to the second 21 and third 38 air streams that are respectively directed to the second 4 and third 34 combustors.

With further regard to the compressed heated air streams 51, 21, 38 supplied to the combustors 3, 4, 34, the system may include an air compressor system including first 10, second 11, and third 42 air compressors, which may be driven by an electric motor 54 in some embodiments, or mechanically coupled to one or more of the turbines 5, 6, 35. The third air compressor 42 may receive a feed air stream 12 (e.g., ambient air) and compress the feed air stream. A first portion 48 of the feed stream 12 compressed by the third air compressor 42 may be directed through the second heat exchanger 1 to form the heated compressed air stream 38, which is supplied to the third combustor 34. A second portion 47 of the feed stream 12 compressed by the third air compressor 34 may be directed to the second air compressor 11. A first portion 20 of the air stream 47 compressed by the second air compressor 11 may be directed through the second heat exchanger 1 to form the heated compressed air stream 21, which is supplied to the second combustor 4. A second portion 14 of the air stream 47 compressed by the second air compressor 11 may be received by the first air compressor 10. The air stream 30 compressed by the first air compressor 10 may be directed through the first heat exchanger 2 to form the first air stream 51, which is supplied to the first combustor 3.

Due to this serial compressor configuration wherein the third combustor 34 receives an air stream 38 compressed by the third air compressor 42, the second combustor 4 receives an air stream 21 compressed by both the third air compressor and the second air compressor 11, and the first combustor 3 receives an air stream 51 compressed by the third air compressor, the second air compressor, and the first air compressor 10, the supply of air to the combustors may vary. In particular, the flow rate of air into the combustors may be highest in the first combustor 3, lowest in the third combustor 34, and in between the flow rates of air for the first and third combustors in the second combustor 4. Further, the fuel streams 26, 24 respectively received by the first and second combustors 3, 4 may be at a relatively higher pressure, due to compression of a feed stream 25 of fuel by a fuel compressor 7 which may be driven by an electric motor 77, as compared to the fuel stream 37 supplied to the third combustor 34, which may not be compressed by the fuel compressor. Accordingly, the flow rates of the fuel streams 26, 24, 37 and the heated compressed air streams 51, 21, 38 may be controlled to provide for desired air to fuel ratios. For example, the flow rates may be configured to provide for substantially stoichiometric combustion. The flow rates of each of the fuel streams 26, 24, 37 to each of the combustors 3, 4, 34 is separately controlled to provide sufficient heat, when combusted in air at near stoichiometric conditions and mixed with recycle flows, to give the required inlet temperature for each of the turbines 5, 6, 35. The air streams 51, 21, 38 are separately controlled at one or more locations (e.g., at the streams 48, 20, 30) to give near stoichiometric combustion of the fuel from the fuel streams 26, 24, 37 in the combustors 3, 4, 34. The flow rates of the recycle streams 57, 40 are separately controlled at one or more locations (e.g., at the streams 60, 16, 17) to give the required flow rate in the combustion streams 27, 23, 36 provided to the turbines 5, 6, 35. Thus, the air supply (e.g., one or more components configured to supply the air streams 51, 21, 38 to the combustors 3, 4, 34) and/or the fuel supply (e.g., one or more of the components configured to supply the fuel streams 26, 24, 37 to each of the combustors 3, 4, 34) may be configured to supply the air stream and the fuel stream in a ratio configured to result in substantially stoichiometric combustion in the combustor (e.g., with up to about 5% excess $O_2$). In this regard, by employing substantially stoichiometric combustion of air streams comprising ambient air, the excess inert gases (e.g., $N_2$ and Ar) resulting from the combustion may be removed from the closed system and vented to atmosphere. For example, stream 36 leaving the third combustor 34 and entering the third turbine 35 may exhibit a high pressure (e.g. 20 bar (2 MPa) to 60 bar (6 MPa)) and high temperature and include a majority concentration of inert gases. After expansion, stream 39 and stream 19 may each have low pressure at or approaching atmospheric pressure. Thusly, the stream is expanded across one or more turbines to produce power and reduce the pressure of the inert gases to substantially atmospheric pressure prior to venting the inert gases to the atmosphere, as described above. Additional description of the operation of the system of FIG. 1 is provided below. However, it should be understood that the temperatures, pressures, fuels, gases, etc. are provided for example purposes. Accordingly, operation of the system may differ in one or more respects from the examples provided in some embodiments.

The system of FIG. 1 can use heat exchangers 2, 1 (e.g., economizers) in a high pressure/low pressure ratio Brayton Power cycle that can use predominantly $N_2$ mixed with $CO_2$ and $H_2O$ combustion products as the working fluid provided to the combustors through a plurality of recycle streams 57, 40, 22, 18. Nitrogen may comprise the primary component in one or more of the recycle streams 57, 40, 22, 18 (e.g., greater than 50% $N_2$ on a molar basis). The high pressure in the combustor 3, may be greater than about 60 bar (6 MPa), greater than about 80 bar (8 MPa), or greater than about 120 bar (12 MPa), or may be in the range from about 80 bar (8 MPa) to about 500 bar (50 MPa), about 100 bar (10 MPa) to about 450 bar (45 MPa), or about 200 bar (20 MPa) to about 400 bar (40 MPa). The pressure ratio across each of the turbines 5, 6, 35 may be in the range from about 4 to about 12, about 5 to about 11, or about 7 to about 10. A fuel stream 26 comprising a hydrocarbon can be combusted in a first high pressure combustor 3 with a near stoichiometric quantity of oxygen from a first heated compressed air stream 51. The fuel stream preferably comprises a hydrocarbon that is gaseous at ambient conditions, such as methane (i.e., natural gas). Other hydrocarbons, however, such as liquefied petroleum gas (LPG), may be used. The fuel stream thus may comprise a compressed hydrocarbon gas (e.g., any combination of $C_1$-$C_4$ hydrocarbon gases). Still further, distillate fuels may be used. Specifically, any liquid fuel obtained from petroleum distillation may be used, such as gasoline, diesel, kerosene, heating oil, and jet fuel. More generally, a suitable liquid fuel may be a petroleum distillate comprising $C_5$-$C_{70}$, $C_6$-$C_{50}$, $C_7$-$C_{30}$, or $C_8$-$C_{20}$ hydrocarbons. The net combustion gas can be mixed with the recycle stream 57 which moderates the temperature of the combustion stream 27 to a value at or below the maximum inlet temperature of the first turbine 5. A portion 60 of the first recycle stream 57 may be preheated in a first heat exchanger 2 using heat from the portion 58 of the discharge stream 28 received from the first turbine 5. The high inlet pressure and inlet temperature and low pressure ratio of the turbines 5, 6 and 35 means that the discharge temperatures may be relatively high, typically in the range 400° C. to 800° C. The heat present in the turbine discharge streams 28, 18 and 39 may be recovered in the heat exchangers 1, 2 to achieve high efficiency and maximize power output.

The temperature of the combustion stream 27 received by the first turbine 5 may be at least about 500° C., at least about 700° C., or at least about 900° C., or it may be in the range of about 900° C. to about 1,600° C., about 1,000° C. to about 1,500° C., or about 1,100° about 1,400° C. Using a high-pressure to low-pressure ratio from about 4 to about 12, about 5 to about 11, or about 7 to about 10 in the first turbine 5 may result in a discharge pressure of the discharge stream 28 in the range from about 6.7 bar (0.67 MPa) to about 125 bar (12.5 MPa), about 12 bar (1.2 MPa) to about 100 bar (10 MPa), about 15 bar (1.5 MPa) to about 75 bar (7.5 MPa), or about 20 bar (2 MPa) to about 57 bar (5.7 MPa). A portion of the combustion stream 27 from the first combustor 3, which may comprise $N_2$+$CO_2$+$H_2O$, may ultimately be discharged to the atmosphere. At least a portion of the combustion stream 27 from the first combustor 3 can be expanded in a second turbine 6 after being reheated in a second combustor 4 with temperature moderation by the second recycle stream 40. The second recycle stream 40 and the second air stream 21 may be heated by the discharge steam 39 from the third turbine 35 in the second heat exchanger 1 to a temperature from about 200° C. to about 800° C., about 300° C. to about 600° C., or about 450° C. to about 550° C.

Optionally, to achieve high efficiency, the combustion stream 23 from the second combustor 4 can be passed through the third turbine 35 with the third combustor 34 positioned between the second 6 and third turbines in order to maximize power output from the combustion stream as it is expanded to atmospheric pressure. The second 6 and third 35 turbines may employ substantially equal pressure ratios. Each of the combustion streams 27, 23, 36 may be at a temperature from about 500° C. to about 1,800° C., about 900° C. to about 1,600° C., or about 1,100° C. to about 1,400° C. The second recycle stream 40 provided to the second combustor 4, and optionally provided to the third combustor 34, and the heated compressed air streams 21, 38 for the second and third combustors are preheated against the discharge stream 39 from the third turbine 35 in the second heat exchanger 1. The discharge stream 39 from the third turbine 35 may be cooled to below 100° C. in the second heat exchanger 1 prior to discharge as a cooled exhaust stream 19. The exhaust stream 19 may preferably have greater than about 5%, greater than about 8%, or greater than about 10% molar $CO_2$ content. In this regard, by causing the exhaust stream 19 to have a relatively high $CO_2$ content, use of a scrubber 97 may be facilitated. As used herein, a scrubber can encompass any apparatus or system configured for removal of a defined component of a stream, more specifically for removal of a pollutant, such as $CO_2$, $SO_x$, and $NO_x$. In particular, any suitable system for $CO_2$ adsorption and removal may be used as the scrubber. Non-limiting examples of solvent based systems that may be used include alkali carbonates as used in the BENFIELD™ Process (UOP, LLC), alcoholamines as used in the ECONAMINE FG PLUS™ process (Fluor Corporation), and alcohols, diols, and ethers as used in the RECTISOL® process (Lurgi, GMBH) and the SELEXOL™ solvent (The Dow Chemical Company). Other systems, such as membrane-based systems, or adsorption systems also could be used. Accordingly, the scrubber 97 may reduce the $CO_2$ content and direct a vent gas 99 to atmosphere. Removed $CO_2$ may be captured for sequestering or for use in other methods. In other embodiments the exhaust stream 19 may be directed to atmosphere without directing the exhaust stream through a purification system.

The amount of air from the heated compressed air streams 51, 21, 38 delivered to each of the combustors 3, 4, 34 can be limited to a near stoichiometric concentration of $O_2$ with a net excess $O_2$ concentration of less than about 5%, less than about 3%, or less than about 2%, or in a range from about 0.1% to about 5%, about 0.15% to about 4%, or about 0.25% to about 3% compared to the stoichiometric quantity required for complete combustion of the fuel 26, 24, 37. By limiting the quantity of air delivered by the heated compressed air streams 51, 21, 38 to the combustors 3, 4, 34 to near stoichiometric levels of $O_2$ for combustion, and recycling $O_2$ depleted combustion product streams, the cycles disclosed herein are distinguished from a conventional gas turbine system used in NGCC plants. A conventional gas turbine may use a compressed air stream to dilute combustion gases produced in the combustors to achieve the required turbine inlet temperature. Typically about two thirds of the total compressed air bypasses the combustion and this results in typically about 14% $O_2$ and about 3% $CO_2$ concentration in the exhaust. In contrast, the systems in accordance with the present disclosure may result in a separated stream 15 produced by combustion in the first combustor 3 and expansion in the first turbine 5, after cooling in the first heat exchanger 2 and cooler 8 and removal of a condensed water stream 31, that has a $CO_2$ content typically in the range from about 6% to about 15%, about 8% to about 14%, or about 10% to about 12% molar compared to about 2% to about 4% for a typical gas turbine system.

Advantageously, for $CO_2$ removal, the compressed separated stream 49 from the discharge stream 28 from the first turbine 5 is available at a preferred pressure range from about 5 bar (0.5 MPa) to about 150 bar (15 MPa) or about 6.5 bar (0.65 MPa) to about 124 bar (12.4 MPa) and at near atmospheric temperature following cooling in the first heat exchanger 2, water removal in a separator 9, and compression at recycle compressor 53. This high partial pressure of the $CO_2$ lowers the capital cost of $CO_2$ removal and allows for increased removal efficiency. For example, from about 50% to about 80%, about 55% to about 75%, or about 60% to about 70% of the total $CO_2$ stream produced by the fuel combustion can be available in this compressed separated stream 49, which may comprise ($N_2$+Ar), $CO_2$, excess $O_2$ and vapour phase residual water from preferably about 15 bar (1.5 MPa) to about 100 bar (10 MPa) and near ambient temperature. The remaining fraction of the total $CO_2$ stream is available in the remaining portion 17 of the separated stream 15 at atmospheric pressure and at a dry basis molar concentration in the range from about 7% to about 15%, about 8% to about 14%, or about 10% to about 12%, which may comprise the same components as the compressed separated stream 49.

The system described herein may comprise a multistage air compressor (comprising first 10, second 11, and third 42 air compressors) supplying air at two or three pressure levels for the combustors 3, 4, 34 and a separate high-pressure low-pressure ratio recycle compressor 53 that may circulate one or more of the recycle streams 57, 40, 22, 18 to one or more of the combustors 3, 4, 34. The air compressors 10, 11, 42 can be electrically driven (e.g., by an electric motor 54), or driven by at least part of the shaft power from the turbines 5, 6 and 35. The air compressors 10, 11, 42 and the recycle compressor 53 can optionally be linked as a single system driven by a single drive system. Alternatively the air compressors 10, 11, 42 and/or the recycle compressor 53 can be separated and driven independently, The first heat exchanger 2 may be configured to provide for cooling of the high pressure turbine discharge stream 28 exiting the first turbine 5 and entering the first heat exchanger at a temperature in the range from about 400° C. to about 1,200° C., about 500° C. to about 1,000° C., or about 600° C. to about 800° C. The heat released by the discharge stream 28 from the first turbine 5 may be used to heat at least a portion 60 of the first recycle stream 57. High efficiency in the overall system is strongly influenced by the achievement of a relatively small temperature differential between the temperature of the discharge stream 28 exiting the first turbine 5 and the heated first recycle stream 57. The specific heat of the compressed separated stream 49 may be significantly higher than that of the discharge stream 28 from the first turbine 5 and even though the flow rate of the discharge stream is higher than the flow rate of the compressed separated stream (due to removal of a condensation stream 31 and the remaining portion 17 of the separated stream 15), there may be insufficient discharge stream flow to result in a relatively small temperature differential across the first heat exchanger 2.

To overcome this problem, a portion 16 of the compressed separated stream 49 may be preheated in the second heat exchanger 1 against the discharge stream 39 from the third turbine 35. The flow rate of the portion 16 of the compressed separated stream 49 may be configured to result in it having a temperature differential of less than about 40° C., less than about 30° C., less than about 20° C., or less than about 10° C. relative to the initial temperature of the discharge stream 39 from the third turbine 35 at the second heat exchanger 1. Thereby, the flow rate of the portion 60 of the compressed separated stream 49 that is directed through the first heat exchanger 2 may be further reduced relative to the flow rate of the discharge stream 28 from the first turbine 5 and a relatively small temperature differential may also be achieved between the first recycle stream 57 and the discharge stream from the first turbine. The portion 16 of the compressed separated stream 49 that is preheated in the second heat exchanger 1 to form a heated flow 50 may be combined with the portion 60 of the compressed separated stream that is heated by the first heat exchanger 2 to form the first heated recycle stream 57. Although illustrated as combining with the portion 60 of the compressed separated stream 49 downstream of the first heat exchanger 2, the heated flow 50 may instead combine with this portion upstream of the first heat exchanger or in the heat exchanger at a point where the two streams have substantially the same temperature.

The remaining portion 17 of the separated stream 15 may bypass the recycle compressor 53 and travel through the second heat exchanger 1 to the second combustor 4 as the second recycle stream 40. The above-described configuration can cause a temperature differential between the flow exiting the first heat exchanger 2 (and at least partially forming the first heated recycle stream 57) and the turbine exhaust 28 from the first turbine 5 in the range from about 10° C. to about 40° C. The heat exchangers 2, 1 may be a multi-channel diffusion bonded heat exchanger (e.g., from the Heatric Division of Meggit PLC) using a high nickel alloy such as alloy 617 or a vacuum brazed stainless steel plate-fin heat exchanger (e.g., from Chart Industries or Sumitomo Precision Products) in some embodiments. Other suitable heat exchangers also may be used.

In a preferred system, a portion 17 of the cooled, separated stream 15 formed from the discharge stream 28; a portion 16 of the cooled, separated, and pressurized stream 49 formed from the discharge stream 28; and air streams 21, 38 for the second 4 and third 34 combustors are heated in the second heat exchanger 1 against the discharge stream 39 from the third turbine 35. The second recycle stream 40 (e.g., the remaining portion 17 of the cooled, separated stream 15 after heating in the second heat exchanger 1) enters the second combustor 4 with fuel stream 24, heated compressed air stream 21 (e.g., the air stream 20 after heating), and a recycled portion 22 of the turbine discharge stream 28. The fuel stream 24 may be compressed by the fuel compressor 7 to a pressure substantially equal to the pressure of the second recycle stream 40. The second combustion stream 23 discharges from the second combustor 4 at a temperature which is suitable for the inlet stream to the second turbine 6 (e.g., in the range from about 900° C. to about 1,600° C.).

A portion 58 of the turbine discharge stream 28 from the first turbine 5 can be directed to the first heat exchanger 2 to heat provide heat to the first recycle stream 57 and the air stream 51 supplied to the first combustor 3. The air stream 51 and the first recycle stream 57 may be heated to a temperature from about 400° C. to about 900° C. and preferably from about 600° C. to about 800° C. After flowing through the first heat exchanger 2, discharge stream 28 forms a cooled stream 33 at a temperature that may be below 100° C. The cooled stream 33 may be further cooled by the cooler 8 to form a cooled stream 32 at a temperature substantially equal to mean ambient temperature in order to cause liquids to condense from the stream, which may be removed as a liquid stream 31 by the separator 9.

The discharge stream 18 from the second turbine 6 is optionally reheated in the third combustor 34 in which the third fuel stream 37 is combusted with the third heated compressed air stream 38. Reheating of the discharge stream 18 exiting the second turbine 6 may achieve inlet temperatures for the third turbine 35 in the range from about 600° C. to about 1,800° C., about 700° C. to about 1,700° C., or about 900° C. to about 1,600° C., increase cycle efficiency by providing the third turbine with working fluid that is at a greater temperature than the discharge stream from the second turbine. The temperature of the discharge stream 39 exiting the third turbine 35 may increase to the range from about 200° C. to about 900° C., limited by the maximum design temperature of the second heat exchanger 1. In embodiments employing a portion 58 of the discharge stream 28 from the first turbine 5 to heat the first heat exchanger 2, the third combustor 34 and the second turbine 6 may be employed to ensure an adequate pressure ratio across the third turbine 35. In general, the third turbine 35 may have a higher pressure ratio than the second turbine 6 and a lower outlet temperature. The inlet temperature of the third turbine 35 should be as high as possible—e.g., in the range from about 1,000° C. to about 1,600° C., limited by the maximum inlet temperature thereof.

The heat exchangers 2, 1 can be a vacuum brazed stainless steel plate-fin heat exchanger or a diffusion bonded high nickel alloy high pressure heat exchanger depending on the design combination of temperature and pressure. Such units are manufactured, for example, by Sumitomo Precision Products, Chart industries or Heatric. Optionally, one or both of the heat exchangers 1, 2 can also be used to preheat part or all of the feed stream of fuel 25 fed to the system. In some embodiments the heat exchangers 2, 1 may be configured to respectively employ the portion 58 of the discharge stream 28 from the first turbine 5 and the discharge stream 39 from the third turbine 35 to heat each of the other fluids respectively received through the heat exchangers from a temperature below about 100° C. to a temperature of from about 300° C. to about 900° C. and preferably to a temperature from about 450° C. to about 800° C. Optionally two or more of the turbines 5, 6, 35 can be linked to a single electric generator 45 via a common drive shaft or via gearboxes to allow different rotational speeds in each turbine to allow for operation of each turbine at their respective optimum speeds. Accordingly, the system may be employed to generate electricity in some embodiments.

Tables 1-4, provided below, illustrate example operational parameters at various streams 12, 28, 22, 23, 58, 51, 18, 24, 19, 27, 33, 32, 31, 15, 26, and 25 and the second combustor 4 during operation of the system illustrated in FIG. 1. The operational parameters are based on operation with a pure methane fuel stream of 0.4536 kmol/hr at ISO conditions with the assumption of 88.7% turbine efficiency and 85% compressor efficiencies. Some compressors shown diagrammatically have been calculated as multistage units with intercooling. No other auxiliary power demands are included. Net efficiency of the system on an LHV basis is calculated to be about 60%.

TABLE 1

Example Operational Parameters at Streams 12, 28, 22, 23, and 58

| | STREAM: | | | | |
|---|---|---|---|---|---|
| | 12 | 28 | 22 | 23 | 58 |
| $O_2$ (kmol/hr) | 9.2533E−01 | 5.3181E−02 | 2.6590E−03 | 3.1486E−01 | 5.0522E−02 |
| $CH_4$ (kmol/hr) | 0 | 2.1455E−25 | 1.0750E−26 | 0 | 2.0412E−25 |
| $CO_2$ (kmol/hr) | 0 | 1.3294E+00 | 6.6471E−02 | 2.3740E−01 | 1.2630E+00 |
| $H_2O$ (kmol/hr) | 4.4614E−02 | 6.1447E−01 | 3.0724E−02 | 2.1364E−03 | 5.8375E−01 |
| AR (kmol/hr) | 4.1076E−02 | 1.2040E−01 | 6.0201E−03 | 3.5056E−02 | 1.1438E−01 |
| $N_2$ (kmol/hr) | 3.4504E+00 | 1.0114E+01 | 5.0569E−01 | 2.9447E+00 | 9.6081E+00 |
| Total Flow (kmol/hr) | 4.4615 | 12.2313 | 0.6116 | 3.5342 | 11.6197 |
| Total Flow (kg/hr) | 128.7128 | 359.4123 | 17.9706 | 104.4543 | 341.4417 |
| Total Flow (m³/hr) | 107.0595 | 27.1543 | 1.3577 | 5.8739 | 25.7966 |
| Temperature (° C.) | 15.5556 | 782.0994 | 782.0994 | 494.6406 | 782.0994 |
| Pressure (bar, MPA) | 1, (0.1) | 40, (4) | 40, (4) | 39, (3.9) | 40, (4) |
| Vapor Fraction | 1 | 1 | 1 | 1 | 1 |
| Liquid Fraction | 0 | 0 | 0 | 0 | 0 |
| Solid Fraction | 0 | 0 | 0 | 0 | 0 |
| Density (kmol/m³) | 0.0417 | 0.4504 | 0.4504 | 0.6017 | 0.4504 |
| Density (kg/m³) | 1.2022 | 13.2359 | 13.2359 | 17.7826 | 13.2359 |
| Liquid Vol (m³/hr at 15.6° C.) | 0.2374 | 0.6333 | 0.0317 | 0.1892 | 0.6016 |

TABLE 2

Example Operational Parameters at Streams 51, 18, 24, and 19

| | STREAM: | | | |
|---|---|---|---|---|
| | 51 | 18 | 24 | 19 |
| $O_2$ (kmol/hr) | 6.6100E−01 | 1.8143E−02 | 0 | 1.8143E−02 |
| $CH_4$ (kmol/hr) | 0 | 1.7418E−25 | 1.4969E−01 | 1.7418E−25 |
| $CO_2$ (kmol/hr) | 1.0255E+00 | 4.5355E−01 | 0 | 4.5355E−01 |
| $H_2O$ (kmol/hr) | 6.6574E−03 | 3.3223E−01 | 0 | 3.3223E−01 |
| AR (kmol/hr) | 1.2040E−01 | 4.1076E−02 | 0 | 4.1076E−02 |
| $N_2$ (kmol/hr) | 1.0114E+01 | 3.4504E+00 | 0 | 3.4504E+00 |
| Total Flow (kmol/hr) | 11.9274 | 4.2954 | 0.1497 | 4.2954 |
| Total Flow (kg/hr) | 354.5368 | 124.8263 | 2.4014 | 124.8263 |
| Total Flow (m³/hr) | 3.7067 | 232.3210 | 0.0806 | 113.2927 |
| Temperature (° C.) | 767.5367 | 507.1197 | 36.7829 | 45.0356 |
| Pressure (bar, MPA) | 304.6, (30.46) | 1.2, (0.12) | 45, (4.5) | 1, (0.1) |
| Vapor Fraction | 1 | 1 | 1 | 0.997645 |
| Liquid Fraction | 0 | 0 | 0 | 0.002355 |
| Solid Fraction | 0 | 0 | 0 | 0 |
| Density (kmol/m³) | 3.2178 | 0.0185 | 1.8571 | 0.0379 |
| Density (kg/m³) | 95.6478 | 0.5373 | 29.7925 | 1.1018 |
| Liquid Vol (m³/hr at 15.6° C.) | 0.6386 | 0.2183 | 0.0080 | 0.2183 |

TABLE 3

Example Operational Parameters at Streams 27 33, and 32 and Combustor 4

| | STREAM: | | | |
|---|---|---|---|---|
| | 4 | 27 | 33 | 32 |
| $O_2$ (kmol/hr) | 1.8143E−02 | 5.3181E−02 | 5.0522E−02 | 5.0522E−02 |
| $CH_4$ (kmol/hr) | 1.7418E−25 | 2.1455E−25 | 2.0412E−25 | 2.0412E−25 |
| $CO_2$ (kmol/hr) | 4.5355E−01 | 1.3294E+00 | 1.2630E+00 | 1.2630E+00 |
| $H_2O$ (kmol/hr) | 3.3223E−01 | 6.1447E−01 | 5.8375E−01 | 5.8375E−01 |
| AR (kmol/hr) | 4.1076E−02 | 1.2040E−01 | 1.1438E−01 | 1.1438E−01 |
| $N_2$ (kmol/hr) | 3.4504E+00 | 1.0114E+01 | 9.6081E+00 | 9.6081E+00 |
| Total Flow (kmol/hr) | 4.2954 | 12.2313 | 11.6197 | 11.6197 |
| Total Flow (kg/hr) | 124.8263 | 359.4123 | 341.4417 | 341.4417 |
| Total Flow (m³/hr) | 14.6788 | 5.5770 | 8.8685 | 6.6699 |
| Temperature (° C.) | 1276.8628 | 1278.2656 | 98.1279 | 17.2222 |
| Pressure (bar, MPA) | 38, (3.8) | 300, (30.0) | 39.6, (3.96) | 39.4, (3.94) |
| Vapor Fraction | 1 | 1 | 0.974572 | 0.950223 |
| Liquid Fraction | 0 | 0 | 0.025428 | 0.049777 |
| Solid Fraction | 0 | 0 | 0 | 0 |
| Density (kmol/m³) | 0.2926 | 2.1932 | 1.3102 | 1.7421 |
| Density (kg/m³) | 8.5038 | 64.4456 | 38.5004 | 51.1912 |
| Liquid Vol (m³/hr at 15.6° C.) | 0.2183 | 0.6333 | 0.6016 | 0.6016 |

TABLE 4

Example Operational Parameters at Streams 31, 15, 26, and 25

| | STREAM: | | | |
|---|---|---|---|---|
| | 31 | 15 | 26 | 25 |
| $O_2$ (kmol/hr) | 1.3063E−07 | 5.0522E−02 | 0 | 0 |
| $CH_4$ (kmol/hr) | 0 | 0 | 3.0391E−01 | 4.5359E−01 |
| $CO_2$ (kmol/hr) | 3.8056E−05 | 1.2629E+00 | 0 | 0 |
| $H_2O$ (kmol/hr) | 5.7836E−01 | 5.3891E−03 | 0 | 0 |
| AR (kmol/hr) | 2.3723E−07 | 1.1438E−01 | 0 | 0 |
| $N_2$ (kmol/hr) | 7.3028E−07 | 9.6081E+00 | 0 | 0 |
| Total Flow (kmol/hr) | 0.5784 | 11.0413 | 0.3039 | 0.4536 |
| Total Flow (kg/hr) | 10.4210 | 331.0207 | 4.8755 | 7.2769 |
| Total Flow (m³/hr) | 0.0104 | 6.6927 | 0.0456 | 0.2651 |
| Temperature (° C.) | 17.1757 | 17.1757 | 221.5596 | 26.6667 |
| Pressure (bar, MPA) | 39.2, (3.92) | 39.2, (3.92) | 300, (30.0) | 40, (40.0) |
| Vapor Fraction | 0 | 1 | 1 | 1 |
| Liquid Fraction | 1 | 0 | 0 | 0 |
| Solid Fraction | 0 | 0 | 0 | 0 |
| Density (kmol/m³) | 55.5867 | 1.6498 | 6.6579 | 1.7109 |

TABLE 4-continued

Example Operational Parameters at Streams 31, 15, 26, and 25

| | STREAM: | | | |
|---|---|---|---|---|
| | 31 | 15 | 26 | 25 |
| Density (kg/m³) | 1001.5065 | 49.4603 | 106.8111 | 27.4475 |
| Liquid Vol (m³/hr at 15.6° C.) | 0.0104 | 0.5912 | 0.0163 | 0.0243 |

The systems disclosed herein can be particularly beneficial in that efficiencies that are comparable to, or greater than, efficiencies in known NGCC systems can be achieved using significantly lower turbine temperatures. Thus, the present inventive systems can use significantly lower maximum turbine temperatures (e.g., the maximum temperature of the fluids through any of the turbines) than the current art and still achieve a net electrical generation efficiency that is comparable to, or greater than, the efficiency of known NGCC systems. In some embodiments, the systems and methods can be described as providing higher efficiency than NGCC for all turbine temperatures.

Heretofore, in order to achieve increased efficiency, it has been necessary to significantly increase turbine operating temperature. For example, conventional NGCC systems have employed maximum turbine temperatures of about 1,500° C. in order to achieve a net efficiency on an LHV basis of about 59%. To reach an efficiency of as much as 64%, the known art has required the use of super high temperature gas turbines operating in the range of 1,700° C. In comparison, the present systems disclosed herein can achieve a net efficiency on an LHV basis of about 60% employing a turbine temperature of about 1,279° C. Additional comparisons between the efficiency of the systems of the present disclosure and existing NGCC systems are illustrated in Table 5 for various turbine operating temperatures:

TABLE 5

Net Efficiency Comparison between Systems of the Present Disclosure and NGCC Systems

| Maximum Turbine Temperature (° C.) | Efficiency of NGCC Systems (% LHV basis) | Efficiency of the Systems of the Present Disclosure (% LHV basis) |
|---|---|---|
| 1100 | 47.5 | 55.5 |
| 1200 | 51 | 58 |
| 1279 | 53.5 | 60 |
| 1400 | 56.5 | 63 |
| 1500 | 59 | 65 |
| 1700 | 64 | 68 |

Thus, in one embodiment the systems disclosed herein may achieve efficiencies comparable to, or greater than, conventional NGCC systems with use of lower maximum turbine temperatures. As noted above, it may be desirable to reduce turbine temperatures to reduce the cost of the turbines by reducing the need for expensive materials configured to withstand high temperatures. Alternatively, the systems disclosed herein may operate at the same maximum temperatures of conventional NGCC systems, but achieve an efficiency that is relatively higher. For example, in one embodiment, a system or method according to the present disclosure can operate with a net electrical generation efficiency on a lower heating value basis of at least about 60% when operating with a turbine temperature from about 1,300° C. to about 1,500° C.

In other embodiments, a system or method according to the present disclosure can operate with a net electrical generation efficiency on a lower heating value basis according to any of the following: at least about 55% at a temperature of about 1,100° C.; at least about 58% at a temperature of about 1,200° C.; at least about 63% at a temperature of about 1,400° C.; at least about 65% at a temperature of about 1,500° C.; or at least about 68% at a temperature of about 1,700° C. In specific embodiments, a system or method according to the present disclosure can operate with a net electrical generation efficiency on a lower heating value basis of at least about 60% when operating with a turbine temperature that is less than about 1,500° C., less than about 1,400° C., or less than about 1,300° C. In still further embodiments, a system or method according to the present disclosure can operate with a net electrical generation efficiency on a lower heating value basis of at least about 55% when operating with a turbine temperature from about 1,100° C. to about 1,300° C.

Figure 2:
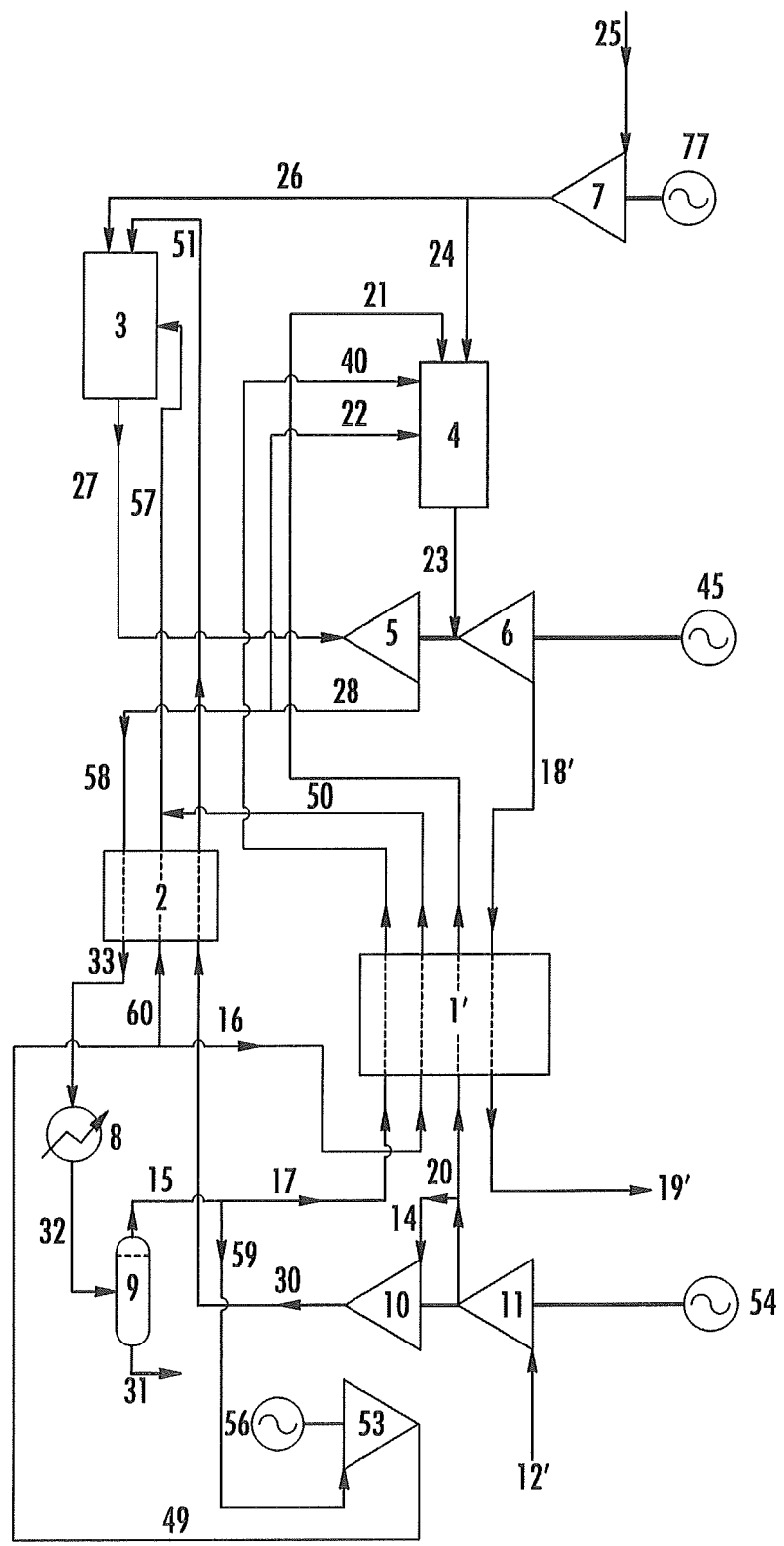
FIG. 2 provides a flow diagram illustrating one power production system including two turbines and method of operation thereof according to another embodiment of the disclosure.

As noted above, the third turbine 35 and the third combustor 34 are optional in some embodiments. In this regard, FIG. 2 illustrates an embodiment of the system that does not include a third combustor, a third turbine, or a third air compressor. The system may be substantially similar to the system of FIG. 1, except for the differences noted. As illustrated, the discharge stream 18' from the second turbine 6 may be directed to the second heat exchanger 1' without first travelling through a third combustor and third turbine. In this embodiment the discharge stream 18' may be at a pressure above atmospheric that is equal to the pressure drop through the second heat exchanger 1 (and any interconnecting piping and/or equipment) between the second turbine 6 and the atmosphere. Note that in this embodiment, a scrubber is not employed. Thus, the cooled discharge stream 19' may be discharged to the atmosphere without first travelling through a scrubber. However, a scrubber system may also be employed in this embodiment, for example, as illustrated in the embodiment of the system of FIG. 1.

Since a third turbine is not employed, the third combustor may not be present as well as the fuel and air streams associated therewith. Accordingly, the air compressor system may not employ a third air compressor, and the second heat exchanger 1' may not heat a third air stream. Thus, the feed air stream 12' may be provided directly to the second air compressor 12', rather than first being compressed by a third air compressor. In other respects the system of FIG. 2 may be substantially similar to the system of FIG. 1.

The use of the high pressure and low pressure ratio first turbine with combustion products there from being expanded in one or two additional power turbine stages coupled with near stoichiometric combustion using pressurized preheated air with recycle streams to moderate turbine inlet temperatures may result in a system having an efficiency in the range from about 55% to about 65%. The high pressures in the system may allow for the plant to define a relatively compact form factor, with a relatively low capital cost. The system could be designed for single train power outputs exceeding 500 MW for base load power generation. The system may also be employed in lower output applications such as ships propulsion units using distillate low sulphur fuel where thermal efficiencies of greater than 50% LHV basis could be achieved.

Many modifications and other embodiments of the disclosure set forth herein will come to mind to one skilled in the art to which the disclosure pertains having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A power production system, comprising:
a first combustor configured to combust a first fuel stream and a first air stream in the presence of a first recycle stream to produce a first combustion stream;
a first turbine configured to expand the first combustion stream;
a first heat exchanger configured to receive at least a portion of a first discharge stream from the first turbine, wherein the first heat exchanger is configured to employ the portion of the first discharge stream to heat the first air stream and at least a portion of the first recycle stream that is produced from the first discharge stream;
a second combustor configured to combust a second fuel stream and a second air stream in the presence of a second recycle stream that is produced from the first discharge stream to produce a second combustion stream;
a second turbine configured to expand the second combustion stream; and
a second heat exchanger configured to heat the second air stream and the second recycle stream,
wherein the first turbine is positioned upstream of the first heat exchanger and the first heat exchanger is positioned upstream of the second turbine in terms of a flow of the first discharge stream.

2. The power production system of claim 1, wherein the second heat exchanger is configured to employ a second discharge stream from the second turbine to heat the second air stream and the second recycle stream.

3. The power production system of claim 1, wherein the second heat exchanger is further configured to heat a second portion of the first recycle stream.

4. The power production system of claim 1, further comprising a third combustor configured to combust a third fuel stream and a third air stream in the presence of a second discharge stream received from the second turbine to produce a third combustion stream; and
a third turbine configured to expand the third combustion stream.

5. The power production system of claim 4, wherein the second heat exchanger is configured to employ a third discharge stream from the third turbine to heat the second air stream and the second recycle stream.

6. The power production system of claim 5, wherein the second heat exchanger is further configured to heat the third air stream.

7. The power production system of claim 5, wherein the second heat exchanger is further configured to heat a second portion of the first recycle stream.

8. The power production system of claim 1, further comprising a recycle compressor configured to compress the first recycle stream.

9. The power production system of claim 1, wherein a second portion of the first discharge stream is directed to the second combustor.

10. The power production system of claim 1, further comprising a scrubber configured to receive a cooled discharge stream from the second heat exchanger.

11. The power production system of claim 10, wherein the scrubber comprises a $CO_2$ adsorption system.

12. The power production system of claim 1, further comprising an air compressor system configured to compress a feed air stream to produce the first air stream and the second air stream.

13. The power production system of claim 12, wherein the air compressor system comprises a first air compressor configured to compress the first air stream and a second air compressor configured to compress the second air stream.

14. The power production system of claim 13, wherein the second air compressor is further configured to compress the first air stream before the first air compressor compresses the first air stream.

15. The power production system of claim 13, wherein the air compressor system is configured to control a flow rate of the first air stream and a flow rate of the second air stream to result in substantially stoichiometric combustion in the first combustor and the second combustor.

16. The power production system of claim 15, wherein the air compressor system is configured to control the flow rate of the first air stream and the flow rate of the second air stream to result in up to about 5% excess $O_2$ in the combustion in the first combustor and the second combustor.

17. The power production system of claim 1, wherein the first fuel stream and the second fuel stream comprise a compressed hydrocarbon gas.

18. The power production system of claim 17, wherein the compressed hydrocarbon gas comprises methane.

19. The power production system of claim 1, wherein the first air stream and the second air stream comprise compressed ambient air.

20. The power production system of claim 1, wherein the first recycle stream and the second recycle stream are greater than 50% $N_2$ on a molar basis.

21. The power production system of claim 1, further comprising a separator configured to remove a liquid stream from the portion of the first discharge stream directed through the first heat exchanger.

22. The power production system of claim 1, wherein the power production system is configured to operate with a net electrical generation efficiency on a lower heating value basis of at least about 60% when operating with a turbine temperature from about 1,300° C. to about 1,500° C.

23. A power production system, comprising:
an air supply configured to supply a first air stream;
a fuel supply configured to supply a first fuel stream,
a first combustor configured to combust the first fuel stream and the air stream in the presence of a first recycle stream to produce a first combustion stream that is greater than 50% N2 on a molar basis,
wherein the air supply and the fuel supply are configured to supply the first air stream and the first fuel stream in a ratio configured to result in substantially stoichiometric combustion in the first combustor with up to about 5% excess 02;
a first turbine configured to expand the first combustion stream;

a first heat exchanger configured to receive at least a portion of a discharge stream from the first turbine,
wherein the first heat exchanger is configured to employ the portion of the discharge stream to heat the first air stream and at least a portion of the first recycle stream that is produced from the discharge stream;
a second combustor configured to combust a second fuel stream and a second air stream in the presence of a second recycle stream that is produced from the discharge stream to produce a second combustion stream;
a second turbine configured to expand the second combustion stream; and
a second heat exchanger configured to heat the second air stream and the second recycle stream.

* * * * *